Patented June 3, 1941

2,244,184

UNITED STATES PATENT OFFICE 2,244,184

UREA-POLYAMIDE-FORMALDEHYDE RESIN

Paul R. Austin and Boynton Graham, Wilmington, Del., assignors to E. I. du Pont de Nemours & Company, Wilmington, Del., a corporation of Delaware No Drawing. Application September 30, 1938, Serial No. 232,681

6 Claims. (Cl. 260—42)

This invention relates to synthetic resins.

This invention has as an object the preparation of new synthetic resins. A further object is the preparation of resins which may be baked to give clear tough and glossy films of use as coatings. A further object is the preparation of resins useful as sizes for fabrics. Another object is the preparation of heat hardening molding powders. Another object is the preparation of top coating compositions for cellulose nitrate coated fabrics. Other objects will appear hereinafter.

These objects are accomplished by the following invention wherein a polyamide-forming composition (including polythioamide-forming composition) is heated with urea to form a low molecular weight polyamide which is then reacted alone, or with urea or other bifunctional amide, with an aldehyde, preferably formaldehyde.

In U. S. Patents 2,071,250, 2,071,253 and 2,130,948 the preparation of linear superpolyamides is described. In these patents are described processes for making very high molecular weight polymers. There are also disclosed processes for viscosity stabilization of the polymers, i. e. the halting of the polymerization at a definite high stage by the use of viscosity stabilizers. Polyamides may be made from suitable monoamino-monocarboxylic acids or their amide-forming derivatives such as lactams or from suitable diamines and dibasic acids. Detailed information is to be found in the patents above-mentioned. In the patents, however, the polymerization is continued to a very high molecular weight product. The process of the present invention, however, uses as raw materials polyamides where the polymerization reaction is halted long before a high molecular weight spinnable polymer is obtained. Dimers and trimers are the main products of the reaction. This halting of the reaction is accomplished by the use of relatively large amounts of urea or its equivalent.

An excess of urea over the theoretically correct amount is used, since the elevated temperature necessary for reaction leads to some decomposition of the urea. No attempt is made to remove the decomposition products of urea from the reaction product, since they are in general also polymerized during subsequent treatment with formaldehyde. While the reaction may be run at superatmospheric pressures, it is most readily conducted at atmospheric pressure. This necessitates the use of a blanket of inert gas such as carbon dioxide or nitrogen to prevent air-oxidation of the amine component. Solvents are not necessary, since the urea itself acts as a solvent and the entire reaction mixture becomes liquid shortly after heating is begun. If a solvent is desired, the phenols or cresols may advantageously be used; at the end of the reaction, usually within twelve hours, the product may be precipitated in flocculent form by the addition of a non-solvent, such as ethyl acetate.

The low molecular weight linear polyamides thus obtained have amide and/or urea end groups. They are hard, colorless powders soluble in phenols and formic acid and with properties which vary with the amount of urea which has been used. These polymers are then reacted with formaldehyde or formaldehyde yielding materials to give the resins of the present invention.

The reaction with formaldehyde usually involves a preliminary condensation in the presence of basic catalysts such as sodium acetate or sodium hydroxide, followed by a final polymerization in a mildly acid medium. The reaction is generally run at the reflux temperature of the solvent used, which may be an alcohol or water. If a higher alcohol, such as isobutanol, is used, the reflux may be so arranged as to remove the water of reaction as formed, returning the solvent to the reaction. In this way, the progress of the reaction may be followed; the end of the reaction being that time at which water fails to appear in the head of the condenser. An excess of formaldehyde is advantageous, since it appears to act as a solvent, thereby speeding the reaction. Unreacted excess formaldehyde may be removed by distillation at the conclusion of the reaction.

The final product is a solution which may be diluted or concentrated to any desired viscosity; solutions containing greater than 60% solids show a tendency to form irreversible gels. More dilute solutions occasionally gel upon cooling, but may be reliquefied by brief heating. Films may be flowed or sprayed from this solution and baked to insolubility in 10 minutes at 100° C. Prolonged baking must be avoided, as the films show a slight tendency to turn brown. These films, when properly prepared, are colorless, bubble-free, transparent, and glossy. Films prepared from resins containing a large amount of urea are hard and brittle. Those containing less urea are softer and much more pliable. The films are readily dyed by silk or wool dyes.

The principles of the invention outlined above are further illustrated in greater detail in the following examples wherein parts are parts by weight. These examples are not intended to limit the invention.

Example I

*First stage.*—An intimate mixture of 105 parts of hexamethylenediammonium adipate and 48 parts of urea is heated with stirring under a blanket of oxygen-free nitrogen at 150° C. The mixture fuses and bubbles vigorously at first. After seven hours, vapor evolution ceases and the odor of ammonia is no longer apparent. The reaction product solidifies on cooling to a colorless brittle solid which melts at 148–150° C., with previous softening. It is soluble in acids, partially soluble in hot alcohols, water, and xylene. Molecular weight determinations indicate that the crude product has a molecular weight of about 252. Successive extractions with water and ethanol leave 80% of the material as an insoluble residue with a molecular weight of 442; thus, the bulk of the reaction product has a molecular weight in the low polymer range. It is, however, not necessary to purify the material in this way; thus the crude product may be caused to react with formaldehyde, as described below.

*Second stage.*—The reaction product of the first stage is added to a solution of 57.2 parts of urea in 226 parts of isobutanol, 200 parts of 37% aqueous formaldehyde which has been brought to a pH of 8.0 with 10% sodium hydroxide is added and the suspension refluxed for four hours. A solution of 1.3 parts of phthalic anhydride in 7 parts of isobutanol plus 13 parts of toluene is then added and refluxing continued, removing water as formed. After 13 hours, when the evolution of water is complete, heating is stopped. The solution, which sets to a thick gel when cooled, is diluted with 133 parts of isobutanol. The resulting solids content, as determined by evaporation, is about 40%.

The solution is found to tolerate one half its own weight of xylene, but the resin precipitates when an equal weight of xylene is added. Acetone likewise precipitates the resin. On the other hand, the solution tolerates several times its own weight of butyl acetate, and any proportion of "Cellosolve," butanol, isobutanol, or dimethyl formamide without turbidity. A film flowed on a steel plate baked clear and tack-free in 10 minutes at 110° C. The film is clear, glossy, and bubble-free. When coated on glass or steel, films are water-sensitive, but when applied over an organic subcoat, such as cellulose nitrate, they become completely water-resistant. The films are compatible with, and plasticized by, an equal weight of a castor oil-modified alkyd resin. The rate of bake can be markedly increased by the use of acidic catalysts, such as phosphorus pentoxide. The films can be readily dyed with silk or wool dyes.

The extraction procedure described above is designed to remove any adipamide, which is soluble in ethanol, and hexamethylene diurea, which is soluble in water; substances which could conceivably be the main products of the reaction. The extracts are indeed found to contain these compounds, but the insolubility of the bulk of the reaction product in these solvents, together with its high molecular weight, shows that the main product of the reaction consists of trimers, tetramers, etc.

Example II

The reaction product prepared as described in the first stage of Example I is added to a mixture of 133 parts of isobutanol and 100 parts of 37% aqueous formaldehyde at a pH of 8.0, and the suspension refluxed. After four hours of refluxing, when the solid has largely dissolved, a solution of 1.3 parts of phthalic anhydride dissolved in 7 parts of isobutanol plus 13 parts of toluene is added, and refluxing continued, removing the water as formed. After 9 hours, evolution of water ceases, and the residue becomes viscous and foams. Distillation is stopped and the residue strained while hot. It sets to a thin opaque gel when cooled. Determinations of solids contents by evaporation shows that the solution contained about 65% solids. Films baked from the solution are similar to those described in Example I, but are softer, and considerably more pliable.

*Fabric impregnation.*—The above gel is diluted to 10% solids with isobutanol, and a sample of cotton muslin is soaked in the resulting solution at room temperature for 15 minutes, squeezed, and baked at 100° C. for 30 minutes. The impregnated fabric is colorless and tack-free. It possesses definite crease resistance, and exhibits good water repellency, which is even further improved by laundering. It readily absorbs 2% of an acid dyestuff, "Pontacyl" Fast Blue 5R, and retains considerable proportions of this dye even when laundered at the boil.

Example III

A solution of 17 parts of the polymer prepared as in the first stage of Example I in 75 parts of methanol plus 40 parts of 37% aqueous formaldehyde at a pH of 8.0 is refluxed for 1.5 hours, 1 part of acetic acid is added and the solution refluxed for four hours more, then concentrated by distillation to half its original volume. Films can be baked from the resulting solution.

Example IV

A suspension of 25 parts of polymer prepared as in the first stage of Example I and 100 parts of 37% aqueous formaldehyde at a pH of 8.0 is dissolved by refluxing for 2 hours, 1.5 parts of acetic acid added, and refluxing continued for 1 hour more. Cooling causes the precipitation of a small amount of flocculent solid which is removed by filtration. The resulting solution is clear and viscous. Addition of acetone or water causes the precipitation of a solid which can be molded into clear homogeneous chips by heating for 10 minutes at 100° C. under a pressure of 5000 pounds. Films can also be baked from the solution.

Example V

Ten parts of polymer prepared as described in the first stage of Example I and 10 parts of urea are refluxed in 50 parts of isobutanol plus 50 parts of 37% aqueous formaldehyde containing 0.1 part sodium acetate for 1.5 hours, then 20 parts of toluene and 1 part of acetic acid is added and refluxing continued, removing water as formed. After 2.25 hours, evolution of water ceases, and the residue, which sets to a weak gel when cooled, is evacuated at 100° C. until it becomes viscous at that temperature. Films baked from this solution are harder and more brittle than those described in Example I.

Example VI

Five parts of polymer prepared as described in the first stage of Example I and 10 parts of urea are suspended in 50 parts of isobutanol, 0.1 part of sodium acetate and 50 parts of 37% formaldehyde added, and the suspension refluxed for one hour, while the solids dissolve. Then 20 parts of toluene and 1 part of acetic acid are added and refluxing continued, removing the water as formed. After 2.5 hours, no more water distills, and the residue is heated in vacuo at 100° C. until it becomes viscous. Films cast from the solution are still harder and more brittle than those described in Example V.

Example VII

*First stage.*—A suspension of 52 parts of hexamethylenediammonium adipate and 6 parts of urea in 125 parts of meta-cresol is heated and stirred under nitrogen at 150° C. for 5 hours, then poured into 700 parts of ethyl acetate, and the resulting white precipitate filtered, dried, powdered, and extracted with hot ethyl acetate. The reaction product softens at 120° C. and melts at 150–154° C.

*Second stage.*—A mixture of 10 parts of the polymer prepared in the first stage, 75 parts of absolute ethanol, and 40 parts of 37% formaldehyde is refluxed for 5.5 hours, then 1 part of acetic acid is added, and refluxing continued for 1 hour. The solution is heated in vacuo at 100° C. until it becomes viscous. Films cast from this solution are very soft.

Example VIII

*First stage.*—An intimate mixture of 105 parts of hexamethylenediammonium adipate and 24 parts of urea is heated with stirring under a blanket of nitrogen at 150° C. for 5 hours, when vapor evolution ceases and the odor of ammonia is no longer apparent. The reaction product solidifies on cooling to a colorless solid which softens at 95° C. and melts at 118° C., and shows approximately the same solubility characteristics as the product described in the first stage of Example I.

*Second stage.*—The reaction product of the first stage is refluxed in 300 parts of isobutanol for 12 hours, then 150 parts of 37% formaldehyde is added, along with 0.2 part of sodium acetate, and refluxing is continued for 1 hour, while the solid dissolves. Then two parts of acetic acid and 10 parts of toluene are added and refluxing continued, removing the water as formed. After 5.5 hours, when water ceases to be formed, the hot solution is strained. Films cast from the resulting solution are intermediate in hardness between those described in Example II and Example VII.

Example IX

*First stage.*—An intimate mixture of 26 parts of hexamethylenediammonium adipate and 3 parts of urea is heated in an evacuated container at 165° C. for 2 hours. The mixture forms a homogeneous melt which foams considerably. The seal is broken and the container is heated under a vacuum at 175° C. for 3 hours, at the end of which time the reaction mass has completely resolidified. The product of the reaction is a white solid melting at 190° C.

*Second stage.*—Seventeen and one-half parts of the reaction product in 150 parts of isobutanol plus 75 parts of 37% formaldehyde containing 0.1 part of sodium acetate is refluxed for 12 hours, strained, and heated in vacuo at 100° C. until the solution becomes viscous. Films baked from this solution are intermediate in hardness between those described in Example VIII and Example VII.

Example X

*First stage.*—An intimate mixture of 28.3 parts of decamethylenediammonium sebacate and 9 parts of urea is heated with stirring under nitrogen at 145–150° C. for six hours. The product, a brittle, colorless solid, softens at 55° C., and is completely melted at 125° C. It is soluble in hot ethanol and hot isobutanol, slightly soluble in hot water, and insoluble in benzene.

*Second stage.*—Ten parts of the first stage reaction product is suspended in 75 parts of isobutanol, 40 parts of 37% aqueous formaldehyde at a pH of 8.0 added, and the suspension refluxed for one hour, while the solid dissolves. Then one part of acetic acid in 15 parts of toluene is added, and refluxing is continued for 2.5 hours, removing water as formed. The final product is a mobile liquid containing a small amount of insoluble solid which is removed by filtration. Films baked from this solution are soft, clear, and tacky after two hours at 125° C. but become tack-free after standing for 1.5 hours at room temperature.

Example XI

*First stage.*—An intimate mixture of 21 parts of hexamethylenediammonium isophthalate and 9 parts of urea is stirred under nitrogen and heated at 150° C. for seven hours. The mixture melts to a clear liquid at 80° C., and evolves vapor at 100° C. The originally clear and fluid liquid becomes opaque and viscous in 1.5 hours. The reaction product is a pale yellow sticky solid, which melts at 85–90° C. It is soluble in hot acetic acid, slightly soluble in water, ethanol and isobutanol, and insoluble in benzene and toluene.

*Second stage.*—A suspension of 10 parts of the product of the first stage in 75 parts of isobutanol plus 40 parts of 37% formaldehyde at a pH of 8.0 is refluxed for one hour, while the solid dissolves. Then one part of acetic acid in 15 parts of toluene is added, and refluxing continued for four hours, removing the water as formed. The product is a mobile, pale yellow liquid. Films baked at 125° C. are tack-free in 10 minutes. They are hard and brittle.

The above examples are illustrative of the invention. Thus, Examples I–IX disclose the use of hexamethylenediammonium adipate, i. e. the use of hexamethylene diamine and adipic acid. Of these, Examples II, VIII, and IX show the effect on the finished film of varying the relative amount of urea used in the first stage of the preparation. Examples I, V, and VI show the effect of varying the relative amount of urea used in the second stage, and Examples III, IV, and VII show the effect on film properties caused by the use of solvents other than isobutanol in the second stage of the preparation. Example X uses decamethylene diamine and sebacic acid, i. e. a longer chain amine and a longer chain aliphatic dibasic acid. Example XI uses hexamethylene diamine and an aromatic dibasic acid. The invention is generic to low molecular weight polyamides, including polythioamides and polythioureas, with urea or amide end groups. These may be made from diamines and dicarboxylic acids or from polymerizable monoaminomonocarboxylic acids or suitable derivatives thereof. Diamines of formula NH₂CH₂RCH₂NH₂ and dicarboxylic acids of formula

HOOCCH₂R′CH₂COOH or their amide-forming derivatives, in which R and R' are divalent hydrocarbon radicals free from olefinic and acetylenic unsaturation and in which R has a chain length of at least two carbon atoms, are particularly useful. Those in which R is $(CH_2)_x$ and R' is $(CH_2)_y$ wherein $x$ and $y$ are integers and $x$ is at least two are especially valuable. Suitable diamines include tetramethylenediamine, pentamethylenediamine, hexamethylenediamine, octamethylenediamine, p-xylylenediamine, triglycoldiamine, diaminoisopropanol, and diethylenetriamine. In general the diamines and dicarboxylic acids disclosed in the above mentioned patents may be used. Suitable acids include glutaric, adipic, pimelic, suberic, lutidinic, sebacic, methyladipic, p-phenylenediacetic, terephthalic, and isophthalic. Any polymerizable monoaminomonocarboxylic acid or a lactam or other amide-forming derivative thereof may be used, including 6-aminocaproic acid, caprolactam, 9-aminononanoic acid and 11-aminoundecanoic acid. The ω-amino acids are particularly desirable.

In the first stage of the reaction the polyamide-forming composition whether diamine and dicarboxylic acid, diamine-dibasic acid salt, monoaminomonocarboxylic acid, or diamine and diisothiocyanate, is reacted with urea. The said composition also may be reacted with thiourea, ammonium isocyanate, ammonium isothiocyanate, biuret, cyanamide, guanidine, its isothiocyanate and carbonate, ammonium carbamate, dicyanodiamide, and similar carbonic and thiocarbonic acid ammonia derivatives known to be equivalent to urea in other resin forming reactions with formaldehyde and other aldehydes. At least one mol of a urea is used per two mols of diamine or monoaminomonocarboxylic acid to give desirable products. Less than this amount of the urea compound gives less desirable results. Larger amounts of urea may be used. The theoretical amount of urea for a dimer or trimer is two mols, i. e. two mols urea for two mols diamine in the dimer or three mols diamine in the trimer. Some excess must be used to allow for decomposition of the urea but an even larger excess is not harmful and for many purposes is advantageous inasmuch as there is formed in the second stage in such event an interpolymer or copolymer of formaldehyde, the urea and the urea modified polyamides or polythioamide.

Varying the relative amount of urea used in the first stage of the reaction leads to the formation of polymer of different molecular weights. This, in turn, leads to variation of the hardness and flexibility of the finished film. In general, much urea leads to resins which form hard, brittle films, less urea gives films which are softer and more flexible. There is no maximum limit to the amount of urea which may be used in the first stage, since any excess over that which enters into the polymerization reaction either remains as such, or decomposes. If too little urea is used, the polyamide molecule becomes too large, and hence so insoluble as to prevent its ready polymerization upon subsequent treatment with formaldehyde. It has been found that the use of 0.5 mol of urea for every mol of diamine-diacid salt gives a satisfactorily soluble product, but that the use of 0.25 mol of urea per mol of salt gives a product which, while still capable of reacting with formaldehyde, is apparently not greatly modified by the reaction, since resulting films are opaque and tend to be granular.

The reaction of urea with the diamine-diacid salt or the polyamide (or including polythioamide) forming component in the first stage is best conducted at the lowest temperature at which reaction occurs, since higher temperatures lead to considerable decomposition of urea to ammonia, carbon dioxide, biuret, cyanogen, etc. It has been found that temperatures of 100–200° C. are satisfactory, although in this temperature range some decomposition of urea occurs, as evidenced by the odor of ammonia. It is not desired, however, to limit the invention to these temperatures, but to a minimum temperature at which the reaction mass liquefies, this being determined by the amount of urea or solvent being used, and a maximum temperature determined by the stability of the reaction product. The time required for reaction is, in general, dependent on the temperature, amount of stirring, and the nature of the reactants. Under the preferred conditions, however, the reaction is generally completed within twelve hours.

In the second stage of the reaction, the product of the first stage is heated with formaldehyde. An excess of formaldehyde is preferably used since an excess is not harmful and, in fact, helps the reaction by dissolving the reaction components. This is done either with or without a catalyst such as sodium hydroxide, sodium acetate, or any other mild alkaline catalyst in catalytic amount. This step may be conducted without a solvent other than the excess formalin but preferred results are obtained by the use of a lower alkanol e. g., methanol, propanol, but preferably isobutanol, amyl alcohol or ethoxyethanol.

The time required for the second stage of the reaction varies with the speed of the removal of the water, as well as the nature of the catalyst used. In general, the reaction is conducted in the presence of basic catalysts until the solution is homogeneous, then acidified and heated until water ceases to be evolved. The preliminary basic catalysis may be effected by the use of sodium acetate, sodium hydroxide, sodium carbonate, or other bases which do not react with formaldehyde. The acid medium required in the final step may be supplied by the use of acetic acid, phthalic anhydride, phthalic acid, and the like. The reaction may also be run without catalysts.

Urea reacts with amines to give alkylated ureas, and with carboxylic acids to give acylated ureas. Thus, in its reaction with the salt of a diamine with a dibasic acid, both reactions occur, along with the competing reaction of amide condensation, and the product consists of a mixture of low molecular weight polyamides with urea end-groups. Since, moreover, there is appreciable decomposition of the urea at the temperature necessary for reaction, ammonia is also present in the reaction mixture; this reacts with certain of the carboxyl groups to form amide end groups, which are also capable of undergoing polymerization when treated with formaldehyde. Thus, the product of the first stage of the preparation is a very complex mixture, whose main components are characterized in that they have a structural unit —NHRNHCOR'—CO— which is taken $x$ times, where $x$ is an integer from 1 to 5 but predominantly or medianly 2 to 3, and further characterized in that they have end groups of the class —$CONH_2$ and —$NHCO$—$NH_2$.

The brittleness of urea-formaldehyde resins, even when highly plasticized, has long been a major problem in their use in coating compositions. Furthermore, superpolyamides, while tough and flexible, are soluble only in acidic and phenolic solvents and hence can find no practical application in the field of solvent-coating. This invention provides a method of combining the valuable properties of both of these types of polymer. Thus, the resins of this invention are soluble in common varnish or resin solvents and, when films are baked to insolubility, they are found to be considerably more flexible than are urea-formaldehyde films. This combination of properties renders them useful in the field of coating compositions. An especially useful application is their use as a top-coating over nitrocellulose coated fabric. When used in this way, the films are found to be considerably more flexible and equally as glossy and tenacious as are ordinary urea-formaldehyde resins. When fabric is impregnated with dilute solutions of the resin, it is found that baking to insolubility renders the fabric more crease resistant, and more water repellent, as well as increasing its affinity for the common silk and wool dyes. The resins in powder form may readily be molded into clear and homogeneous compositions.

As many apparently widely different embodiments of this invention may be made without departing from the spirit and scope thereof, it is to be understood that we do not limit ourselves to the specific embodiments hereof except as defined by the appended claims.

We claim:

1. Process which comprises reacting under condensation reaction conditions a diprimary diamine and a dibasic dicarboxylic acid in approximately equimolecular amount with at least one mol of urea per two mols of diamine and reacting this reaction product with formaldehyde.

2. The process which comprises heating under condensation reaction conditions a system comprising a normally solid mixture of urea and a composition which is per se polyamide-forming, to a temperature above the liquefaction point of the said mixture per se, the said composition comprising essentially molecules which each contain two and only two reactive groups, the said groups being attached to different carbon atoms, being complementarily amide-forming with other reactive groups attached to molecules in the said composition which each contain two and only two reactive groups, being separated by a divalent organic radical, and belonging to the class of reactive groups consisting of amino and carboxyl groups, continuing the said reaction conditions until a substantial amount of condensation of the urea has occurred, yielding a low molecular weight aqueous formaldehyde soluble polymer, solid at ordinary temperatures, and reacting the said polymer with formaldehyde.

3. The product formed in accordance with the process of claim 1.

4. The product formed in accordance with the process of claim 1 wherein the polyamide-forming composition comprises a diprimary diamine salt of a dibasic dicarboxylic acid.

5. The process set forth in claim 1 wherein the reacting with formaldehyde mentioned therein is conducted in the presence of an alcohol.

6. The process which comprises reacting urea under condensation reaction conditions at a temperature within the range 100-200° C., with a composition which is per se polyamide-forming, which composition comprises essentially molecules which each contain two and only two reactive groups, the said groups being attached to different carbon atoms, being complementarily amide-forming with other reactive groups attached to molecules in the said composition which each contain two and only two reactive groups, being separated by a divalent organic radical, and belonging to the class of reactive groups consisting of amino and carboxyl groups, continuing the said reaction conditions until a substantial amount of condensation of the urea has occurred, yielding a low molecular weight aqueous formaldehyde soluble polymer, solid at ordinary temperatures, and reacting the said polymer with formaldehyde.

PAUL R. AUSTIN.
BOYNTON GRAHAM.